(12) United States Patent
Nicholas et al.

(10) Patent No.: US 12,405,654 B2
(45) Date of Patent: Sep. 2, 2025

(54) MANAGING POWER DELIVERY AT AN INFORMATION HANDLING SYSTEM

(71) Applicant: Dell Products L.P., Round Rock, TX (US)

(72) Inventors: Ken Nicholas, Leander, TX (US); Merle Jackson Wood, III, Round Rock, TX (US); Chin Jui Liu, Taoyuan (TW)

(73) Assignee: Dell Products L.P., Round Rock, TX (US)

( * ) Notice: Subject to any disclaimer, the term of this patent is extended or adjusted under 35 U.S.C. 154(b) by 140 days.

(21) Appl. No.: 18/492,053

(22) Filed: Oct. 23, 2023

(65) Prior Publication Data

US 2025/0130621 A1   Apr. 24, 2025

(51) Int. Cl.
| | |
|---|---|
| *G06F 1/26* | (2006.01) |
| *G06F 1/32* | (2019.01) |
| *G06F 1/3212* | (2019.01) |
| *G06F 1/3234* | (2019.01) |

(52) U.S. Cl.
CPC .......... *G06F 1/3234* (2013.01); *G06F 1/3212* (2013.01)

(58) Field of Classification Search
CPC .............................. G06F 1/3234; G06F 1/3212
See application file for complete search history.

(56) References Cited

U.S. PATENT DOCUMENTS

| | | | | |
|---|---|---|---|---|
| 11,803,229 | B1* | 10/2023 | Yung | G06F 1/28 |
| 2002/0084798 | A1* | 7/2002 | Osburn | G01R 31/30 |
| | | | | 702/64 |
| 2005/0289375 | A1* | 12/2005 | Ranganathan | G06F 1/26 |
| | | | | 713/300 |
| 2014/0095897 | A1* | 4/2014 | Ji | G06F 1/3212 |
| | | | | 713/300 |
| 2015/0355698 | A1* | 12/2015 | Luo | G06F 1/26 |
| | | | | 702/62 |
| 2017/0147050 | A1* | 5/2017 | Berke | G06F 1/26 |
| 2020/0304028 | A1* | 9/2020 | Noh | H02M 3/158 |
| 2020/0363850 | A1* | 11/2020 | Lee | G06F 1/266 |
| 2022/0215798 | A1* | 7/2022 | Pyun | G09G 3/2096 |
| 2022/0236754 | A1* | 7/2022 | Dinh | G06F 1/3243 |
| 2022/0334628 | A1* | 10/2022 | Lee | G06F 1/26 |

(Continued)

*Primary Examiner* — Xuxing Chen
(74) *Attorney, Agent, or Firm* — McDermott Will & Schulte LLP (57) ABSTRACT

Managing power delivery, including receiving, at a first stage voltage regulator, an input power signal having a first voltage value; accessing a first table that indicates a correspondence between a parameter and voltage values of the input power signal; identifying a particular voltage value of the input power signal that is associated with the parameter; setting the voltage of the input power signal received by the first stage voltage regulator to the particular voltage value; accessing a second table indicating correspondence between the parameter and voltage values of an output voltage of an output power signal of the first stage voltage regulator; identifying a specific voltage value of the output voltage associated with parameter; setting the voltage of the output power signal output by the first stage voltage regulator to the specific voltage value; providing, by the first stage voltage regulator, the output power signal to second stage voltage regulators.

16 Claims, 3 Drawing Sheets

(56) References Cited

U.S. PATENT DOCUMENTS

| | | | | |
|---|---|---|---|---|
| 2022/0376623 A1* | 11/2022 | Singh | .................. | G05F 1/575 |
| 2023/0066436 A1* | 3/2023 | Rutkowski | .......... | H02M 1/0009 |
| 2023/0387799 A1* | 11/2023 | Wang | ................ | H02M 1/0067 |
| 2024/0069612 A1* | 2/2024 | Messick | ................ | G06F 1/28 |
| 2024/0250542 A1* | 7/2024 | Liang | .................. | H02J 7/0044 |
| 2025/0142710 A1* | 5/2025 | Pham | ................ | H05K 1/0203 |

\* cited by examiner

MANAGING POWER DELIVERY AT AN INFORMATION HANDLING SYSTEM

BACKGROUND

Field of the Disclosure

The disclosure relates generally to an information handling system, and in particular, managing power delivery at the information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in a method of managing power delivery at an information handling system, including receiving, at a first stage voltage regulator, an input power signal having a first voltage value; identifying a parameter of the information handling system; accessing a first table that indicates a correspondence between the parameter of the information handling system and voltage values of the input power signal; identifying, based on accessing the first table, a particular voltage value of the input power signal that is associated with the parameter; setting the voltage of the input power signal received by the first stage voltage regulator to the particular voltage value; accessing a second table indicating a correspondence between the parameter and voltage values of an output voltage of an output power signal of the first stage voltage regulator; identifying, based on accessing the second table, a specific voltage value of the output voltage associated with parameter; setting the voltage of the output power signal output by the first stage voltage regulator to the specific voltage value; and providing, by the first stage voltage regulator, the output power signal to one or more second stage voltage regulators.

Other embodiments of these aspects include corresponding systems, apparatus, and computer programs, configured to perform the actions of the methods, encoded on computer storage devices.

These and other embodiments may each optionally include one or more of the following features. For instance, measuring, based on the first voltage value of the input power signal, a system power demand multiple times over a time period; determining, based on the measuring, an average system power demand for the time period; accessing the first table that indicates a correspondence between system power demand and voltage values of the input power signal; identifying, based on accessing the first table, the particular voltage value of the input power signal associated with the determined average system power demand; accessing the second table indicating a correspondence between system power demand and voltage values of the output voltage of the output power signal of the first stage voltage regulator; and identifying, based on accessing the second table, the specific voltage value of the output voltage associated with the determined average system power demand. Identifying a configuration of the information handling system; accessing the first table that indicates a correspondence between the configuration of the information handling system and voltage values of the input power signal; identifying, based on accessing the first table, the particular voltage value of the input power signal that is associated with the configuration; accessing the second table indicating a correspondence between the configuration and voltage values of the output voltage of the output power signal of the first stage voltage regulator; and identifying, based on accessing the second table, the specific voltage value of the output voltage associated with configuration. Identifying thermal settings of the information handling system; accessing the first table that indicates a correspondence between the thermal settings of the information handling system and voltage values of the input power signal; identifying, based on accessing the first table, the particular voltage value of the input power signal that is associated with the thermal settings; accessing the second table indicating a correspondence between the thermal settings and voltage values of the output voltage of the output power signal of the first stage voltage regulator; and identifying, based on accessing the second table, the specific voltage value of the output voltage associated with thermal settings. Identifying a battery charge rate of the information handling system; accessing the first table that indicates a correspondence between the battery charge rate of the information handling system and voltage values of the input power signal; identifying, based on accessing the first table, the particular voltage value of the input power signal that is associated with the battery charge rate; accessing the second table indicating a correspondence between the battery charge rate and voltage values of the output voltage of the output power signal of the first stage voltage regulator; and identifying, based on accessing the second table, the specific voltage value of the output voltage associated with battery charge rate. The first voltage value is 48 volts. After providing the output power signal to the one or more second stage voltage regulators, the method further including: receiving, at the first stage voltage regulator, the input power signal having the particular voltage value; identifying an updated parameter of the information handling system; identifying, based on accessing the first table, an updated particular voltage value of the input voltage that is associated with the updated parameter; setting the voltage of the input power signal received by the first stage voltage regulator to the updated particular voltage value; identifying, based on accessing the second table, an updated specific voltage value of the output voltage associated with updated parameter; and setting the voltage of the output power signal output by the first stage voltage regulator to the updated specific voltage value. Determining that a state of charge (SOC) of a battery of the information handling system is above a threshold; in response to determining that the SOC of the battery of the information handling system is above the threshold, determining that a power event has occurred; and in response to determining that the power event has been occurred, setting the voltage of the input power signal to the first voltage value.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This disclosure discusses methods and systems for managing power delivery at the information handling system. In short, the information handling system, and computing modules of the information handling system, can include multiple configurations from multiple differing venders with varying power ranges. The input voltage to a first stage voltage regulator and the output voltage provided by the first stage voltage regulator can be adjusted to optimize the efficiency of the information handling system, the computing modules, and second stage voltage regulators.

Specifically, this disclosure discusses a system and a method for managing power delivery at an information handling system, including receiving, at a first stage voltage regulator, an input power signal having a first voltage value; identifying a parameter of the information handling system; accessing a first table that indicates a correspondence between the parameter of the information handling system and voltage values of the input power signal; identifying, based on accessing the first table, a particular voltage value of the input power signal that is associated with the parameter; setting the voltage of the input power signal received by the first stage voltage regulator to the particular voltage value; accessing a second table indicating a correspondence between the parameter and voltage values of an output voltage of an output power signal of the first stage voltage regulator; identifying, based on accessing the second table, a specific voltage value of the output voltage associated with parameter; setting the voltage of the output power signal output by the first stage voltage regulator to the specific voltage value; and providing, by the first stage voltage regulator, the output power signal to one or more second stage voltage regulators.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 1:
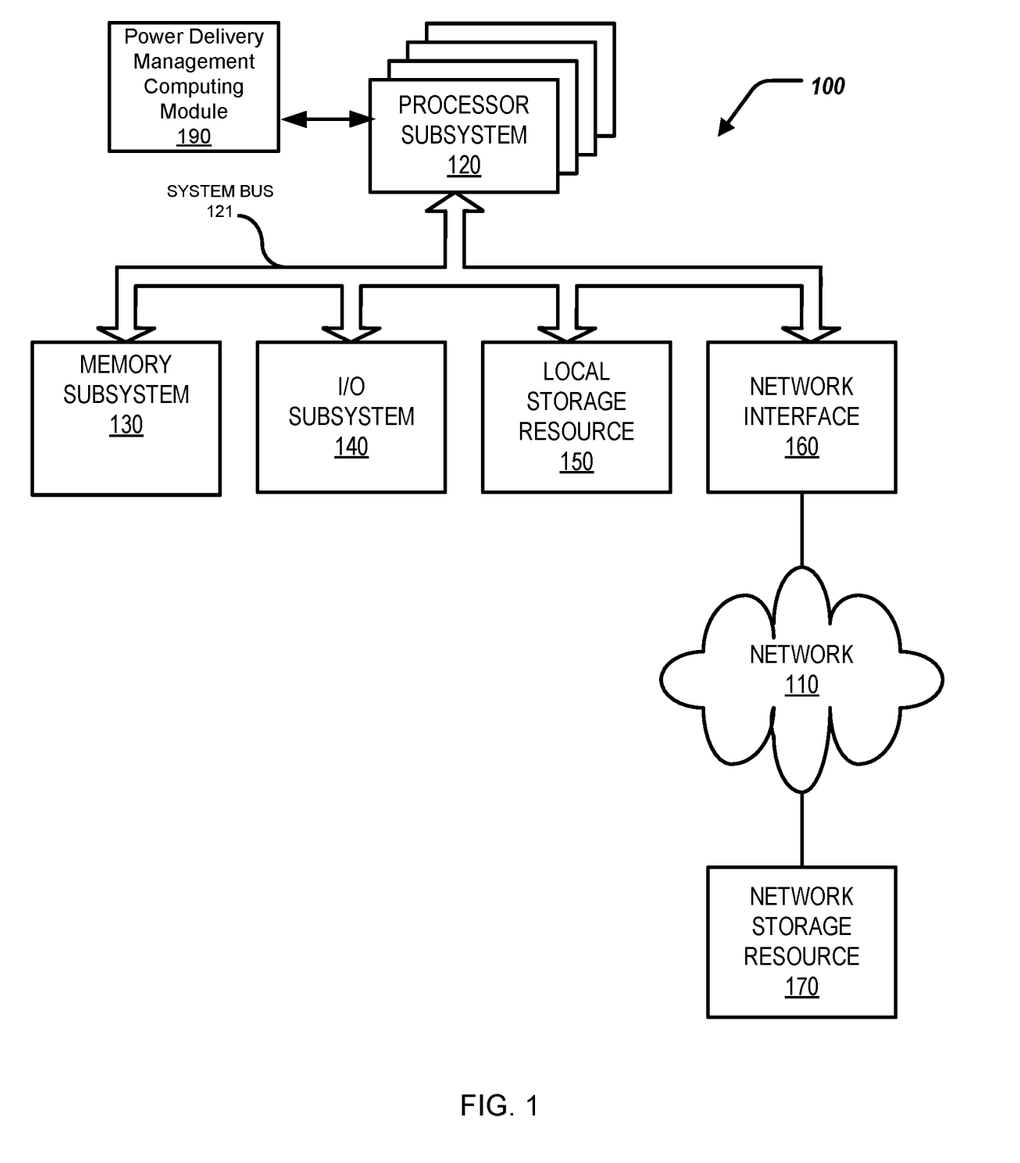
FIG. 1 is a block diagram of selected elements of an embodiment of an information handling system.
Figure 2:
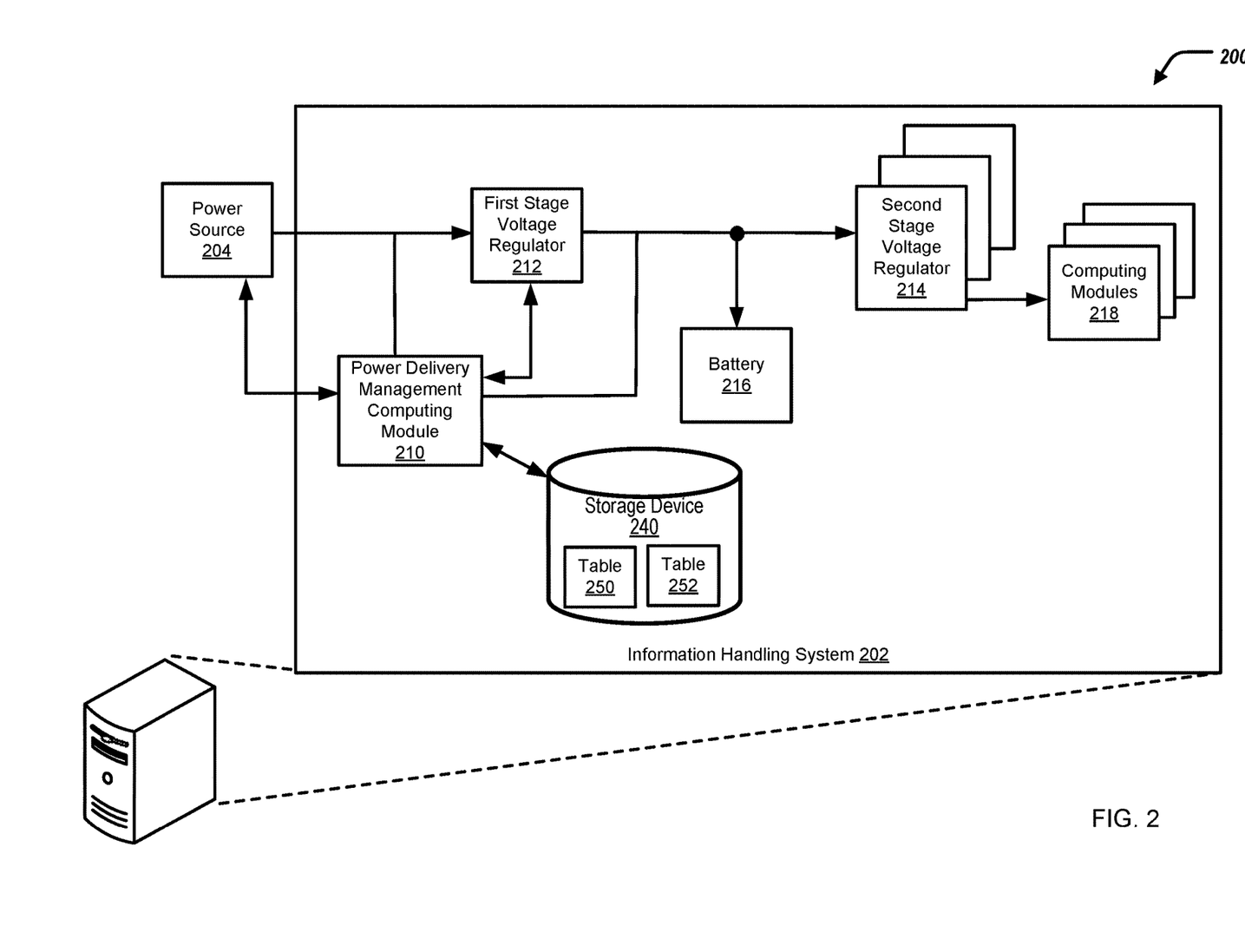
FIG. 2 illustrates a block diagram of an information handling system for managing power delivery at the information handling system.
Figure 3:
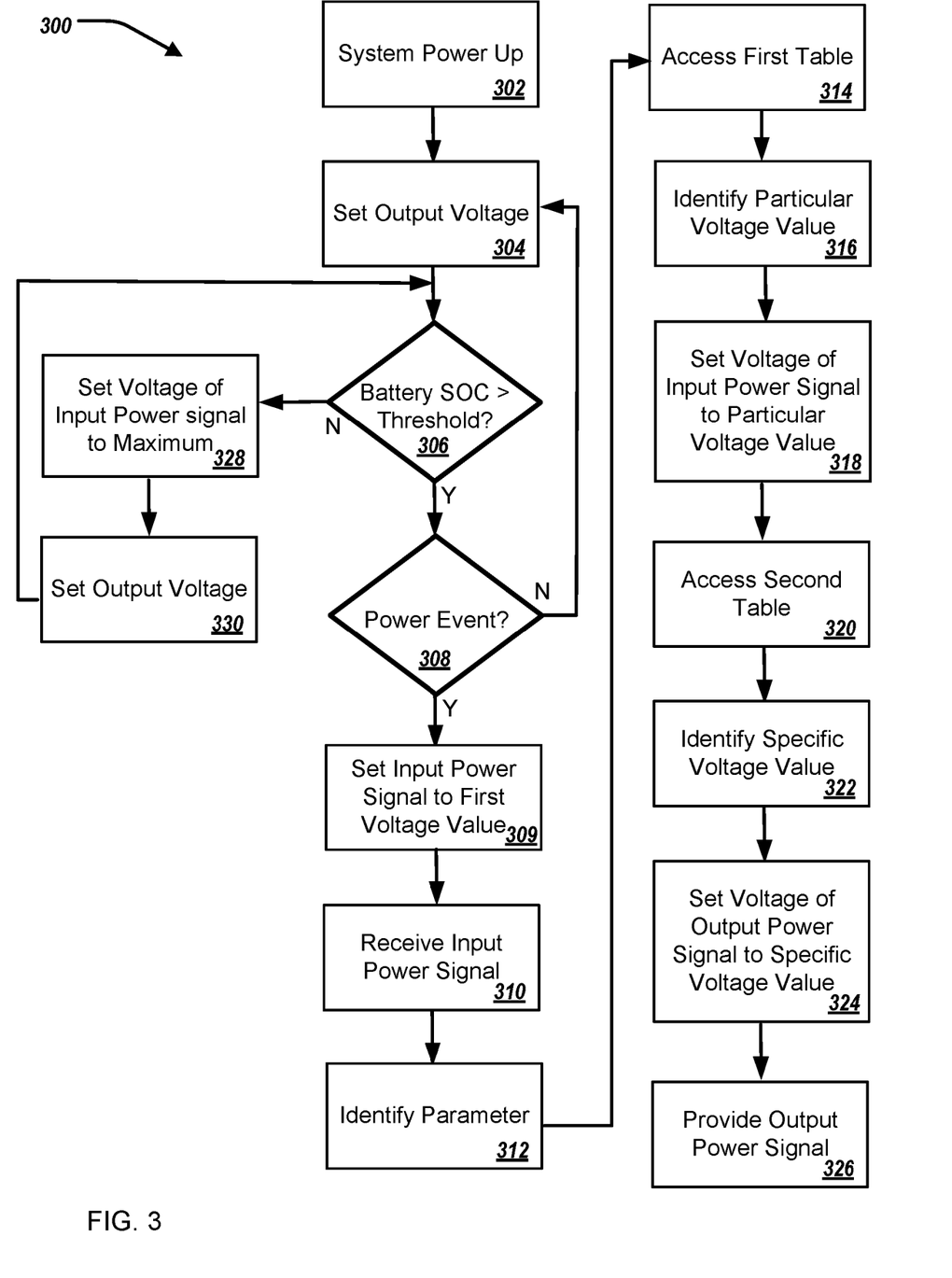
FIG. 3 illustrates a method for managing power delivery at the information handling system.

Particular embodiments are best understood by reference to FIGS. 1-3 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include a power delivery management computing module 190. The power delivery management computing module 190 can be in communication with the processor subsystem 120, or included by the processor subsystem 120. In some examples, the power delivery management computing module 190 is included by an embedded controller (EC) of the information handling system 100.

Turning to FIG. 2, FIG. 2 illustrates an environment 200 including an information handling system 202 and a power source 204. The information handling system 202 can include a power delivery management computing module 210, a first stage voltage regulator 212, one or more second stage voltage regulators 214, a battery 216, computing modules 218, and a storage device 240. In some examples, the information handling system 202 is similar to, or includes, the information handling system 100 of FIG. 1. In some examples, the power delivery management computing module 210 is the same, or substantially the same, as the power delivery management computing module 190 of FIG. 1.

The power delivery management computing module 210 can be in communication with the power source 204 and the first stage voltage regulator 212. The power delivery management computing module 210 can be in communication with the storage device 240.

In some examples, the first stage voltage regulator 212 is a buck converter.

In some examples, the computing modules 218 can include a graphics processing unit (GPU), a central processing unit (CPU), or other similar computing elements.

The second stage voltage regulators 214 can be in electrical communication with the computing modules 218. Specifically, a respective second stage voltage regulator 214 can be in electrical communication with a respective computing module 218. The second stage voltage regulator 214 can regulate the voltage provided to the respective computing module 218.

To that end, in short, the information handling system 202, and the computing modules 218, can include multiple configurations from multiple differing venders with varying power ranges. The input voltage to the first stage voltage regulator 212 and the output voltage provided by the first stage voltage regulator 212 can be adjusted to optimize the efficiency of the information handling system 202, the computing modules 218, and the second stage regulators 214.

The first stage voltage regulator 212 can receive the input power signal from the power source 204. The input power signal, initially, can have a first voltage value. For example, the first voltage value of the input power signal can be 28 volts, 36 volts, or 48 volts.

The power delivery management computing module 210 identifies a parameter of the information handling system 202. The parameter can be associated with the performance of the information handling system 202. In some examples, the parameter of the information handling system 202 is a configuration of the information handling system 202. The configuration of the information handling system 202 can include a configuration of the computing modules 218—which types of computing modules 218 are included (e.g., GPU, CPU, etc.). The configuration of the information handling system 202 can include a configuration of the computing modules 218—specific implementation of the computing modules 218 (e.g., type, model, maker, version).

In some examples, the parameter of the information handling system 202 is thermal settings of the information handling system 202. For example, the information handling system 202 can operate at a specific processing capability/capacity (of the computing modules 218) for a specific operating temperature of the information handling system 202 (and associated fan noise of a fan of the information handling system 202). For example, the thermal settings can indicate a balance between the processing capability/capacity of the information handling system 202 and the operating temperature of the information handling system 202. For example, the thermal settings can include an optimized thermal setting, a cool thermal setting, a quiet thermal setting, and an ultra performance thermal setting.

In some examples, the parameter of the information handling system 202 is a battery charge rate of the information handling system 202. For example, the battery 216 of the information handling system 202 can be associated with a battery charge rate.

In some examples, the parameter of the information handling system 202 is associated with a power demand of the information handling system 202. For example, the power demand can be associated with the power demand of the computing modules 218. Specifically, the power delivery management computing module 210 can measure, based on the first voltage value of the input power signal, a system power demand multiple times over a time period. For example, the power delivery management computing module 210 can measure, based on the first voltage value of the input power signal, a system power demand multiple times (e.g., every 1 millisecond, 1 second) over a time period of the computing modules 218. The power delivery management computing module 210 determines, based on the measuring, an average system power demand for the time period. That is, the power delivery management computing module 210 averages the system power demand for the time period based on the multiple measured system power demands (e.g., of the computing modules 218) and the length of the time period.

The power delivery management computing module 210 can access a first table 250 that is stored by the storage device 240. The first table 250 can indicate a correspondence between the parameter of the information handling system 202 and voltage values of the input power signal. In some examples, the first table 250 indicates a correspondence between the system power demand and the voltage values of the input power signal. In some examples, the first table 250 indicates a correspondence between the configuration of the information handling system 202 and the voltage values of the input power signal. In some examples, the first table 250 indicates a correspondence between the thermal settings of the information handling system 202 and the voltage values of the input power signal. In some examples, the first table 250 indicates a correspondence between the battery charge rate and the voltage values of the input power signal.

The power delivery management computing module 210 can identify, based on accessing the first table 250, a particular voltage value of the input power signal that is associated with the parameter. In some examples, the power delivery management computing module 210 can identify the particular voltage value of the input power signal that is associated with the configuration of the information handling system 202. In some examples, the power delivery management computing module 210 can identify the particular voltage value of the input power signal that is associated with the thermal settings of the information handling system 202. In some examples, the power delivery management computing module 210 can identify the particular voltage value of the input power signal that is associated with the battery charge rate of the information handling system 202.

In some examples, the power delivery management computing module 210 can identify the particular voltage value of the input power signal that is associated with the determined average system power of the information handling system 202. That is, the particular voltage value of the input power signal that is associated with the determined average system power of the information handling system 202 maximizes a power or computing efficiency of the information handling system 202.

For example, the first table 250 can indicate for an average system power less than 120 Watts, the particular value of the input power signal is 20 Volts; for an average system power between 120 Watts and 160 Watts, the particular value of the input power signal is 28 Volts; for an average system power between 160 Watts and 180 Watts, the particular value of the input power signal is 36 Volts; and for an average system power greater than 180 Watts, the particular value of the input power signal is 48 Volts.

The power delivery management computing module 210 can set the voltage of the input power signal received by the first stage voltage regulator 212 to the particular voltage value. That is, the power delivery management computing module 210 can communicate with the power source 204 to negotiate the voltage value of the input power signal, and in particular, set the voltage of the input power signal provided by the power source to the particular voltage value.

The power delivery management computing module 210 accesses a second table 252 that is stored by the storage device 240. The second table 252 can indicate a correspondence between the parameter of the information handling system 202 and voltage values of an output voltage of an output power signal of the first stage voltage regulator 212. In some examples, the second table 252 indicates a correspondence between the system power demand and the voltage values of the output voltage of the output power signal of the first stage voltage regulator 212. In some examples, the second table 252 indicates a correspondence between the configuration of the information handling system 202 and the voltage values of the output voltage of the output power signal of the first stage voltage regulator 212. In some examples, the second table 252 indicates a correspondence between the thermal settings of the information handling system 202 and the voltage values of the output voltage of the output power signal of the first stage voltage regulator 212. In some examples, the second table 252 indicates a correspondence between the battery charge rate and the voltage values of the output voltage of the output power signal of the first stage voltage regulator 212.

The power delivery management computing module 210 can identify, based on accessing the second table 252, a specific voltage value of the output voltage that is associated with the parameter. In some examples, the power delivery management computing module 210 can identify the specific voltage value of the output voltage that is associated with the configuration of the information handling system 202. In some examples, the power delivery management computing module 210 can identify the specific voltage value of the output voltage that is associated with the thermal settings of the information handling system 202. In some examples, the power delivery management computing module 210 can identify the specific voltage value of the output voltage that is associated with the battery charge rate of the information handling system 202.

In some examples, the power delivery management computing module 210 can identify the specific voltage value of the output voltage that is associated with the determined average system power of the information handling system 202. That is, the specific voltage value of the output power signal that is associated with the determined average system power of the information handling system 202 maximizes a power or computing efficiency of the information handling system 202.

For example, the second table 252 can indicate for an average system power less than 20% of the thermal design power (TDP), the specific value of the output voltage is the voltage of the battery plus charger overheard (e.g. additional voltage needed to operate the computing module 210, and/or the regulators 210, 212); for an average system power between a system minimum (SysMin) and a system middle (SysMid), the specific value of the output voltage is 16 Volts; for an average system power between a system middle (SysMid) and a system maximum (SysMax), the specific value of the output voltage is 18 Volts; and for an average system power greater than a system maximum (SysMax), the specific value of the output voltage is 20 Volts. The TDP, SysMin, SysMid, SysMax are based on a characterization of the first stage voltage regulator 212, and/or the second stage voltage regulator 214 aggregate efficiencies.

The power delivery management computing module 210 can set the voltage of the output power signal output by the first stage voltage regulator 212 to the specific voltage value. That is, the power delivery management computing module 210 can communicate with the first stage voltage regulator 212 to negotiate the voltage value of the output power signal, and in particular, set the voltage of the output power signal provided by first stage voltage regulator 212 to the specific voltage value.

The first stage voltage regulator 212 can provide the output power signal to the second stage voltage regulators 214. That is, the first stage voltage regulator 212 can provide the output power signal having the specific value to the second stage voltage regulators 214. The second stage voltage regulators 214 can then regulate the voltage as appropriate for each of the respective computing modules 218.

The first stage voltage regulator 212 can receive the input power signal from the power source 204 having the particular voltage value. The power delivery management computing module 210 identifies an updated parameter of the information handling system 202. The updated parameter can be associated with the performance of the information handling system 202. In some examples, the updated parameter is the configuration of the information handling system 202. In some examples, the updated parameter is thermal settings of the information handling system 202. In some examples, the updated parameter is a battery charge rate of the information handling system 202. In some examples, the updated parameter is associated with the power demand of the information handling system 202. The power delivery management computing module 210 can identify, based on accessing the first table 250, an updated particular voltage value of the input power signal that is associated with the parameter. The power delivery management computing module 210 can set the voltage of the input power signal received by the first stage voltage regulator 212 to the updated particular voltage value. The power delivery management computing module 210 can identify, based on accessing the second table 252, an updated specific voltage value of the output voltage that is associated with the parameter. The power delivery management computing module 210 can set the voltage of the output power signal output by the first stage voltage regulator 212 to the updated specific voltage value. The first stage voltage regulator 212 can provide the output power signal to the second stage voltage regulators 214. That is, the first stage voltage regulator 212 can provide the output power signal having the updated specific value to the second stage voltage regulators 214. The second stage voltage regulators 214 can then regulate the voltage as appropriate for each of the respective computing modules 218.

FIG. 3 illustrates a flowchart depicting selected elements of an embodiment of a method 300 for managing power delivery at the information handling system. The method 300 may be performed by the information handling system 100, the information handling system 202, the power delivery management computing module 210, the first stage voltage regulator 212, and/or the second stage voltage regulator 214, and with reference to FIGS. 1-2. It is noted that certain operations described in method 300 may be optional or may be rearranged in different embodiments.

The information handling system 202 is powered up, at 302. That is the power source 204 can provide power/energy to the information handling system 202, and in particular, the first stage voltage regulator 212 and the power delivery management computing module 210. The first stage voltage regulator 212 sets the output voltage thereof to a voltage of the battery 216 plus the charger overhead (e.g., additional voltage needed to operate the computing module 210, and/or the regulators 210, 212) and passes such to the battery 216 and the second stage voltage regulators 214.

The power delivery management computing module 210 determines whether a charge of the battery 216 is above a threshold, at 306. That is, the power delivery management computing module 210 determines whether a state of charge (SOC) of the battery 218 is above a threshold. For example, the threshold can be 80% of a full charge capacity (FCC) of the battery 216. For example, the threshold can be 100% of the FCC of the battery 216. In some examples, the power delivery management computing module 210 determines that the SOC of the battery 216 is above the threshold (at 306), and in response, determines whether a power event occurs to cause the information handling system 202 to enter power state S0, at 308. For example, the power event include depression of a power button of the information handling system 202 (e.g., by a user of the information handling system 202); adjusting a physical state of the information handling system 202 to an open state (e.g., by a user "opening" the information handling system 202); and/or a remote wakeup operation at the information handling system 202. In some examples, the power delivery management computing system 210 determines that the power event has occurred (at 308), and in response, sets the voltage of the input power signal to the first voltage value, at 309.

The first stage voltage regulator 212 receives the input power signal having the first voltage value, at 310. The power delivery management computing module 210 identifies a parameter of the information handling system 202, at 312. For example, the parameter can be an average system power demand of the information handling system 202, a configuration of the information handling system 202, thermal settings of the information handling system 202, a battery charge rate of the information handling system 202, or a combination thereof.

The power delivery management computing module 210 accesses the first table 250, at 314. The first table 250 indicates a correspondence between the parameter of the information handling system 202 and voltage values of the input power signal. The power delivery management computing module 210 identifies, based on the first table 250, a particular voltage value of the input power signal that is associated with the parameter, at 316. The power delivery management computing module 210 sets the voltage of the input power signal received by the first stage voltage regulator 212 to the particular voltage value, at 318.

The power delivery management computing module 210 accesses the second table 252, at 320. The second table 252 indicates a correspondence between the parameter of the information handling system 202 and voltage values of an output voltage of an output power signal of the first stage voltage regulator 212. The power delivery management computing module 210 identifies, based on the second table 252, a specific voltage value of the output voltage associated with the parameter, at 322. The power delivery management computing module 210 sets the voltage of the output power signal output by the first stage voltage regulator 212 to the specific voltage value, at 324. The first stage voltage regulator 212 provides the output power signal to the second stage voltage regulators 214, at 326.

In some examples, the power delivery management computing module 210 determines that the SOC of the battery 216 is below the threshold (at 306), and in response, sets the voltage of the input power signal to a maximum value, at 328. The first stage voltage regulator 212 sets the output voltage thereof to the voltage of the battery plus charger overhead (e.g., additional voltage needed to operate the computing module 210, and/or the regulators 210, 212) and passes such to the battery 216, at 330.

In some examples, the power delivery management computing system 210 determines that the power event has not occurred (at 308), and in response, proceeds to step 304.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method of managing power delivery at an information handling system, the method comprising:
    receiving, at a first stage voltage regulator, an input power signal having a first voltage value;
    identifying a parameter of the information handling system;
    accessing a first table that indicates a correspondence between the parameter of the information handling system and voltage values of the input power signal;
    identifying, based on accessing the first table, a particular voltage value of the input power signal that is associated with the parameter;
    setting the voltage of the input power signal received by the first stage voltage regulator to the particular voltage value;

accessing a second table indicating a correspondence between the parameter and voltage values of an output voltage of an output power signal of the first stage voltage regulator;
identifying, based on accessing the second table, a specific voltage value of the output voltage associated with parameter;
setting the voltage of the output power signal output by the first stage voltage regulator to the specific voltage value; and
providing, by the first stage voltage regulator, the output power signal to one or more second stage voltage regulators.

2. The method of claim 1, further including:
measuring, based on the first voltage value of the input power signal, a system power demand multiple times over a time period;
determining, based on the measuring, an average system power demand for the time period;
accessing the first table that indicates a correspondence between system power demand and voltage values of the input power signal;
identifying, based on accessing the first table, the particular voltage value of the input power signal associated with the determined average system power demand;
accessing the second table indicating a correspondence between system power demand and voltage values of the output voltage of the output power signal of the first stage voltage regulator; and
identifying, based on accessing the second table, the specific voltage value of the output voltage associated with the determined average system power demand.

3. The method of claim 1, further including:
identifying a configuration of the information handling system;
accessing the first table that indicates a correspondence between the configuration of the information handling system and voltage values of the input power signal;
identifying, based on accessing the first table, the particular voltage value of the input power signal that is associated with the configuration;
accessing the second table indicating a correspondence between the configuration and voltage values of the output voltage of the output power signal of the first stage voltage regulator; and
identifying, based on accessing the second table, the specific voltage value of the output voltage associated with configuration.

4. The method of claim 1, further including:
identifying thermal settings of the information handling system;
accessing the first table that indicates a correspondence between the thermal settings of the information handling system and voltage values of the input power signal;
identifying, based on accessing the first table, the particular voltage value of the input power signal that is associated with the thermal settings;
accessing the second table indicating a correspondence between the thermal settings and voltage values of the output voltage of the output power signal of the first stage voltage regulator; and
identifying, based on accessing the second table, the specific voltage value of the output voltage associated with thermal settings.

5. The method of claim 1, further including:
identifying a battery charge rate of the information handling system;
accessing the first table that indicates a correspondence between the battery charge rate of the information handling system and voltage values of the input power signal;
identifying, based on accessing the first table, the particular voltage value of the input power signal that is associated with the battery charge rate;
accessing the second table indicating a correspondence between the battery charge rate and voltage values of the output voltage of the output power signal of the first stage voltage regulator; and
identifying, based on accessing the second table, the specific voltage value of the output voltage associated with battery charge rate.

6. The method of claim 1, wherein the first voltage value is 48 volts.

7. The method of claim 1, after providing the output power signal to the one or more second stage voltage regulators, the method further including:
receiving, at the first stage voltage regulator, the input power signal having the particular voltage value;
identifying an updated parameter of the information handling system;
identifying, based on accessing the first table, an updated particular voltage value of the input voltage that is associated with the updated parameter;
setting the voltage of the input power signal received by the first stage voltage regulator to the updated particular voltage value;
identifying, based on accessing the second table, an updated specific voltage value of the output voltage associated with updated parameter; and
setting the voltage of the output power signal output by the first stage voltage regulator to the updated specific voltage value.

8. The method of claim 1, further including:
determining that a state of charge (SOC) of a battery of the information handling system is above a threshold;
in response to determining that the SOC of the battery of the information handling system is above the threshold, determining that a power event has occurred; and
in response to determining that the power event has been occurred, setting the voltage of the input power signal to the first voltage value.

9. An information handling system, comprising:
a first stage voltage regulator configured to receive an input power signal having a first voltage value;
one or more second stage voltage regulators;
a processor;
memory media storing instructions executable by the processor to perform operations, comprising:
identify a parameter of the information handling system;
access a first table that indicates a correspondence between the parameter of the information handling system and voltage values of the input power signal;
identify, based on accessing the first table, a particular voltage value of the input power signal that is associated with the parameter;
set the voltage of the input power signal received by the first stage voltage regulator to the particular voltage value;

access a second table indicating a correspondence between the parameter and voltage values of an output voltage of an output power signal of the first stage voltage regulator;

identify, based on accessing the second table, a specific voltage value of the output voltage associated with parameter; and set the voltage of the output power signal output by the first stage voltage regulator to the specific voltage value, wherein the first stage voltage regulator is further configured to provide the output power signal to one or more second stage voltage regulators.

10. The information handling system of claim 9, the operations further including:

measuring, based on the first voltage value of the input power signal, a system power demand multiple times over a time period;

determining, based on the measuring, an average system power demand for the time period;

accessing the first table that indicates a correspondence between system power demand and voltage values of the input power signal;

identifying, based on accessing the first table, the particular voltage value of the input power signal associated with the determined average system power demand;

accessing the second table indicating a correspondence between system power demand and voltage values of the output voltage of the output power signal of the first stage voltage regulator; and identifying, based on accessing the second table, the specific voltage value of the output voltage associated with the determined average system power demand.

11. The information handling system of claim 9, the operations further including:

identifying a configuration of the information handling system;

accessing the first table that indicates a correspondence between the configuration of the information handling system and voltage values of the input power signal;

identifying, based on accessing the first table, the particular voltage value of the input power signal that is associated with the configuration;

accessing the second table indicating a correspondence between the configuration and voltage values of the output voltage of the output power signal of the first stage voltage regulator; and identifying, based on accessing the second table, the specific voltage value of the output voltage associated with configuration.

12. The information handling system of claim 9, the operations further including:

identifying thermal settings of the information handling system;

accessing the first table that indicates a correspondence between the thermal settings of the information handling system and voltage values of the input power signal;

identifying, based on accessing the first table, the particular voltage value of the input power signal that is associated with the thermal settings;

accessing the second table indicating a correspondence between the thermal settings and voltage values of the output voltage of the output power signal of the first stage voltage regulator; and identifying, based on accessing the second table, the specific voltage value of the output voltage associated with thermal settings.

13. The information handling system of claim 9, the operations further including:

identifying a battery charge rate of the information handling system;

accessing the first table that indicates a correspondence between the battery charge rate of the information handling system and voltage values of the input power signal;

identifying, based on accessing the first table, the particular voltage value of the input power signal that is associated with the battery charge rate;

accessing the second table indicating a correspondence between the battery charge rate and voltage values of the output voltage of the output power signal of the first stage voltage regulator; and identifying, based on accessing the second table, the specific voltage value of the output voltage associated with battery charge rate.

14. The information handling system of claim 9, wherein the first voltage value is 48 volts.

15. The information handling system of claim 9, after providing the output power signal to the one or more second stage voltage regulators, the operations further including:

receiving, at the first stage voltage regulator, the input power signal having the particular voltage value;

identifying an updated parameter of the information handling system;

identifying, based on accessing the first table, an updated particular voltage value of the input voltage that is associated with the updated parameter;

setting the voltage of the input power signal received by the first stage voltage regulator to the updated particular voltage value;

identifying, based on accessing the second table, an updated specific voltage value of the output voltage associated with updated parameter; and setting the voltage of the output power signal output by the first stage voltage regulator to the updated specific voltage value.

16. The information handling system of claim 9, the operations further including:

determining that a state of charge (SOC) of a battery of the information handling system is above a threshold;

in response to determining that the SOC of the battery of the information handling system is above the threshold, determining that a power event has occurred; and in response to determining that the power event has occurred, setting the voltage of the input power signal to the first voltage value.

* * * * *